Sept. 16, 1969     E. V. SEMONIN     3,467,159
PNEUMATIC TIRE
Filed Feb. 13, 1967     2 Sheets-Sheet 1
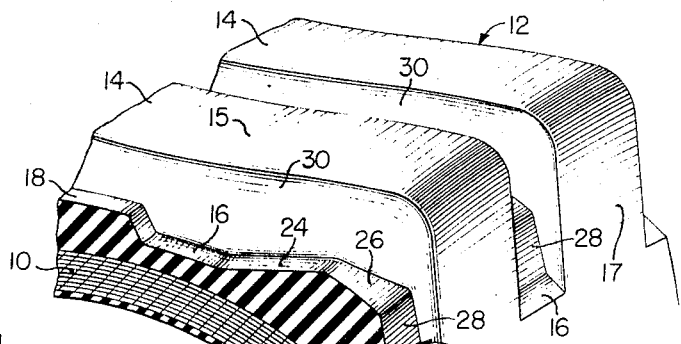
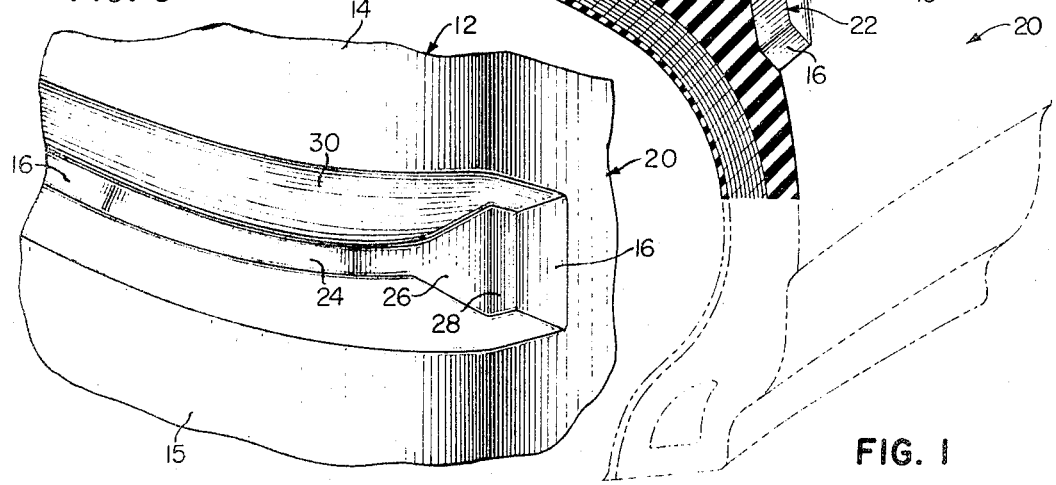
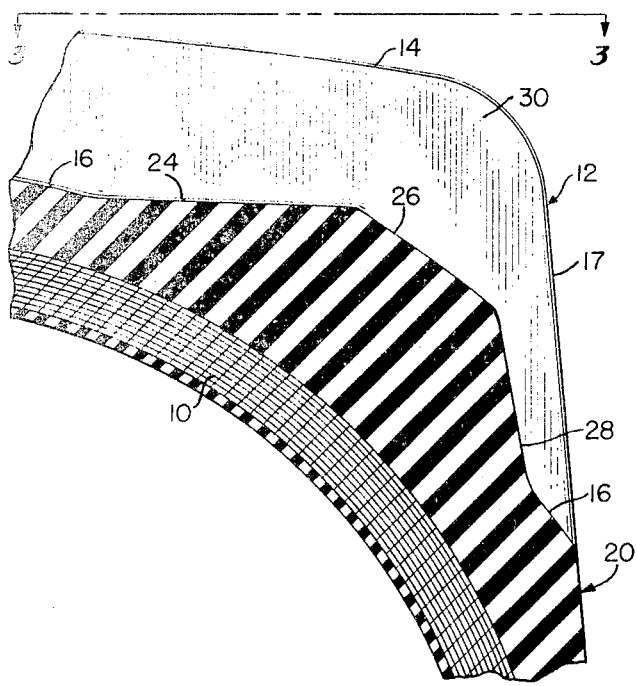
INVENTOR.
EMMET V. SEMONIN
BY
J.B. Holden
ATTORNEY

INVENTOR.
EMMET V. SEMONIN

BY

AGENT

United States Patent Office 3,467,159
Patented Sept. 16, 1969

3,467,159
PNEUMATIC TIRE
Emmet V. Semonin, Akron, Ohio, assignor to The Goodyear Tire & Rubber Company, Akron, Ohio, a corporation of Ohio
Continuation-in-part of application Ser. No. 482,339, Aug. 25, 1965. This application Feb. 13, 1967, Ser. No. 625,276
Int. Cl. B60c 11/00
U.S. Cl. 152—209          13 Claims

ABSTRACT OF THE DISCLOSURE

A pneumatic tire particularly for off-the-road vehicles which has a wide and flat or generally cylindrical tread made up of traction ribs and intervening grooves extending from side to side to give improved lateral stability. An undertread between the carcass and the outer tread provides lugs or wedges between each pair of ribs at the center line and at the shoulder region which increase the undertread thickness and form submerged circumferential ribs exposed in the lateral grooves but covered by the laterally extending ribs of the outer tread.

---

The foregoing abstract is not to be taken as limiting the invention of this application, and in order to understand the full nature and extent of the technical disclosure of this application, reference must be made to the accompanying drawings and the following detailed description.

The present application is a continuation in part of a prior copending application, Ser. No. 482,339, filed Aug. 25, 1965, and now abandoned.

This invention relates to pneumatic tires and more particularly to a novel and improved pneumatic tire particularly adapted for use on off-the-road vehicles.

For use with certain off-the-road equipment such as front loaders and the like, it is desirable to provide tires which will provide traction and stability of a character normally attributed to endless metal track drives. However, it is also desirable in such equipment to assure that that the cushioning capabilities of the tire will be sufficient to maintain the advantages of the use of pneumatic tires. While tires have been designed with treads which provide the desired traction, often the lateral stability of such tires is not sufficiently great to avoid undesirable lateral movement and canting of the vehicle, particularly under off-center loading condition. For example, in connection with a front loader having a scoop or the like extending forwardly of the vehicle, when the front wheels of the vehicle are turned, a load carried by the scoop or bucket may not be centered relative to the wheels causing the vehicle to have a tendency to tilt to one side, due to deflection of the tires on the side nearer the load, which can cause the load to be spilled, or if the vericle is on an incline, could cause the vehicle to slide or tend to tip over.

It is the primary object of the present invention to provide a novel and improved pneumatic tire for off-the-road service which will have improved lateral stability approaching that of an endless metal track while at the same time will retain the usual advantages of pneumatic tires over metal tracks.

It is further an object of the present invention to provide a pneumatic tire of the type described having reduced deflection under load adjacent the lateral edges of the tread so as to approach the rigidity of a metal track, while at the same time will, under load, have sufficient deflection to provide the advantages of the use of pneumatic tires.

Other objects will be in part obvious and in part pointed out in more detail hereinafter.

The invention accordingly consists in the features of construction, combination of elements and arrangement of parts which will be exemplified in the construction hereafter set forth, and the scope of the application of which will be indicated in the appended claims.

For a fuller understanding of the nature and objects of the invention, reference should be had to the following detailed description taken in connection with the accompanying drawing in which:

FIGURE 1 is a fragmentary, sectional, isometric view of a pneumatic tire constructed in accordance with the present invention;

FIGURE 2 is an enlarged, fragmentary, cross-sectional view of a portion of the tire of FIGURE 1;

FIGURE 3 is a fragmentary plan view of a portion of the tire of FIGURE 1;

Figure 5:
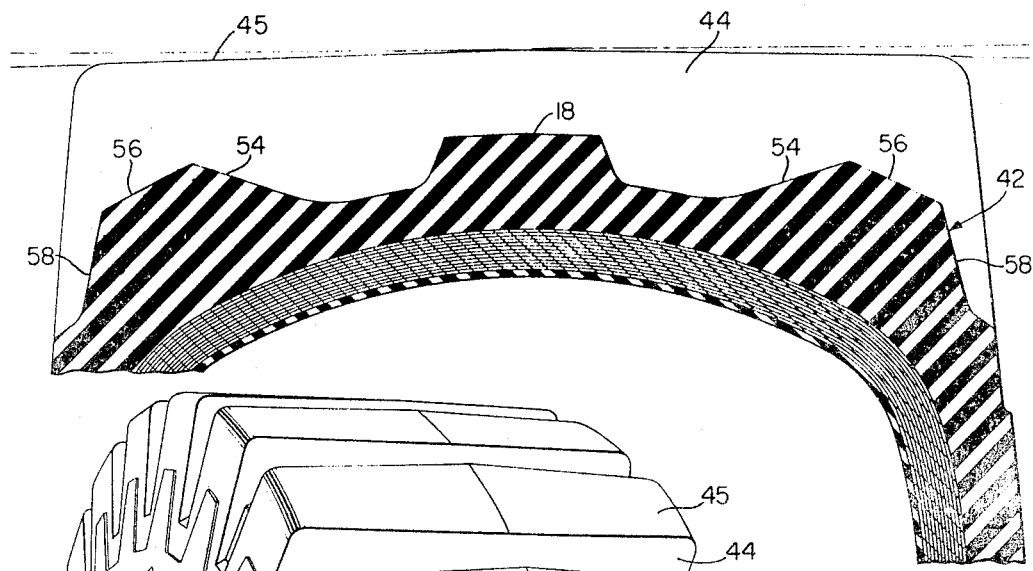
FIGURE 5 is a cross-sectional view taken generally as indicated by line 5—5 of FIGURE 4.

With reference to the drawings, and to FIGURES 1, 2 and 3 in particular, a pneumatic tire of a type with which this invention is concerned comprises a carcass 10 which is generally toroidal in shape and which is fabricated using a plurality of plies of suitable material extending from bead to bead. Disposed over and about the carcass and fixed thereto is a tread portion 12 having a plurality of traction members or ribs 14. The ribs or bars 14 extend generally laterally of the tire and are spaced apart circumferentially of the tire being separated by intervening grooves 16. In the specific embodiment shown each rib 14 extends entirely across the tread, although it will be understood that other rib configurations may be used without departing from the invention.

A plurality of lugs 18 are disposed centrally between each next adjacent pair of ribs and extend upwardly from the bottoms of the grooves 16, terminating at a point spaced substantially below the ground contacting surfaces 15 of the ribs 14. The central lugs 18 extend only a short distance longitudinally of the grooves 16 and in opposite directions from the circumferential centerline of the tire to provide stiffening of the central portion of the tread. Also as will be apparent from a consideration of FIGURES 1 and 2, the under-tread portion of the tire below the bottoms of the grooves 16 increases in thickness as the under-tread approaches the shoulder area of the tire from the circumferential centerline of the tire, thereby to provide greater rigidity in the shoulder and buttress regions of the tire as well as to reduce the curvature of the grooves 16 about the cross-sectional axis of the tire and relative to the ground contacting surfaces 15 of the ribs 14. The construction of a tire thus far described is, of course, well known in the art.

In accordance with the present invention, a wedge or lug 22 is provided between each next adjacent pair of ribs 14 in the shoulder region of the tire. Each lug 22 of the specific embodiment shown is formed integrally with the under-tread and tread portion and is disposed between the outer end of the respectively associated groove 16 and a central lug 18 in spaced relationship to both. More particularly, as best shown in FIGURE 3, the lug 22, which has a longitudinal cross-sectional shape of a truncated triangle, has a first surface 24 which extends from the bottom of the associated groove 16 in a direction generally parallel to the rotational axis of the tire. The surface 24 thus extends at a large obtuse angle to the bottom of the groove 16, which angle preferably approaches 180 degrees. The surface 24 terminates at its outer end in the shoulder region of the tire in a second surface 26 extending at an angle of substantially greater than 180 degrees to the surface 24 and laterally outwardly of the tread and angularly of and toward the rotational axis of the tire. The second surface 26 terminates at its other end in a third surface 28 which extends generally toward the rotational axis of the tire to a point of intersection with the outer end portion of the bottom of the groove 16. The point of intersection of the surface 28 and bottom of the groove 16 is spaced inwardly of but relatively closely to the adjacent outer end of the groove. The wedge 22 extends a substantial distance above the bottom of the groove 16 but terminates short of the outer surface 15 of the next adjacent ribs 14. Preferably the height of the wedge 22 above the bottom of the groove 16 is approximately 40 to 45 percent of the non-skid depth of the tread, which is defined as the dimension between the bottom of a groove 16 and the outer surface 15 of the respectively associated ribs 14.

The wedges 22 are disposed for the most part in the shoulder and buttress regions of the tire with the surface 24 of each wedge having its inner end disposed in substantial spaced relation to the mid-circumferential plane of the tire. Thus, the wedges 24 serve to tend to reduce deflection of the tire, under load, at the outer lateral edge portions of the tread portion so as to provide a more rigid metal track-like characteristic. The large obtuse angle between each surface 24 and next adjacent bottom of the associated groove 16 provides a smooth continuation of the groove bottom so as to encourage flow of earth laterally of the tire or in other words longitudinally of the space between the ribs 14 and provide a self-cleaning tread, thus minimizing clogging of the tread grooves which would adversely affect traction. The sidewall 30 of the ribs 14 forming the sidewalls of the grooves 16 are inclined inwardly and toward each other at least in the general area of the wedges so as to tend to obviate the retention of stones and the like between the ribs. The outer surface 28 of each wedge being spaced inwardly from the outer end of the respective groove and extending generally parallel with the laterally outwardly facing surfaces 17 of the ribs as well as at a large acute angle to the axis of rotation of the tire enhances the lateral stability of the tire particularly in soft earth or the like.

The wedges 22 extend upwardly from the bottoms of the groove 16 a substantial distance and extend between the ribs 14 on opposite sides of the wedge and are integrally molded with the tread and under-tread of the tire. The wedges thus reinforce the ribs 14 by tending to resist deflection of the ribs in a direction circumferentially of the tire so as to enhance the track-like performance of the ribs. Further, the wedges 22, in cooperation with the bottom of the grooves 16, provide a generally track-like configuration which is generally complementary to the outwardly facing surfaces 15 of the ribs 14.

Figure 4:
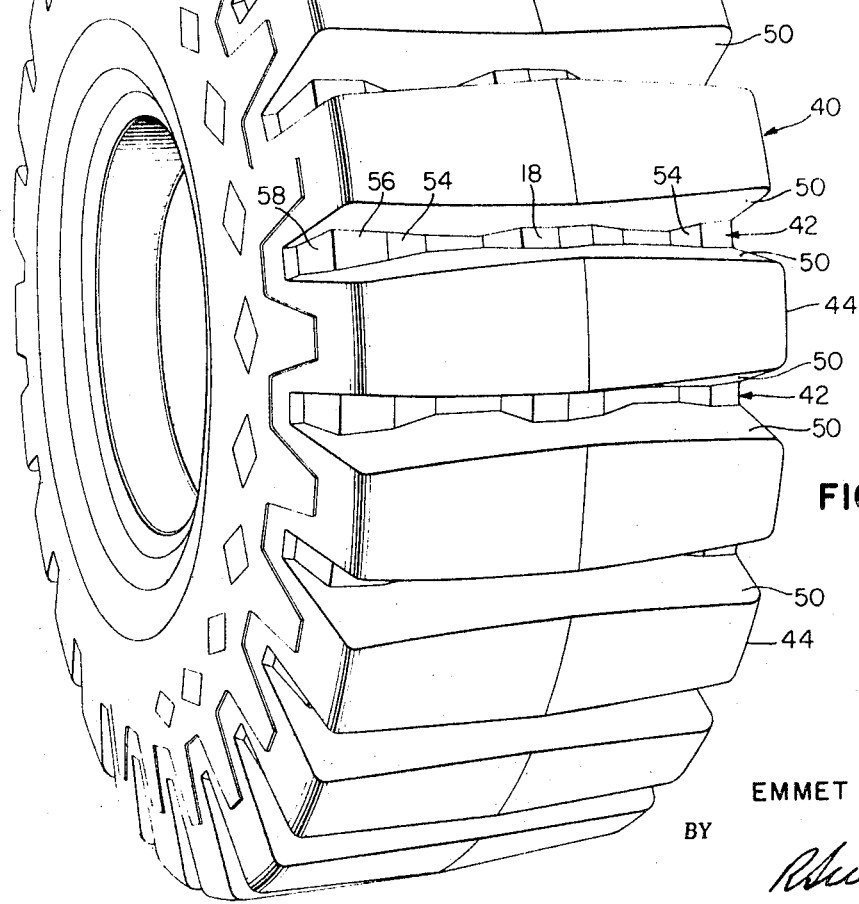
FIGURE 4 is a partial elevation in perspective of an alternative form of the tire in accordance with the instant invention.

With reference to FIGURES 4 and 5 the tire 40 is generally similar to the tire 20 of FIGURE 1 and comprises a wedge or lug 42 provided between each next adjacent pair of traction ribs 44 in the shoulder region of the tire. As in the case of the lugs 22 of the tire of FIGURE 1, each wedge or lug 42 is formed integrally with the tread and with the under-tread which increases in thickness as it progresses toward the shoulders of the tire. Also, each lug is disposed between the outer end of the respectively associated groove 46 and a central lug 48 and in spaced relationship to both. The surfaces 54, 56, and 58 of each lug 42 are in all respects similar to the surfaces 24, 26, and 28 described in connection with the lug 22 in the tire of FIGURE 1.

In keeping with the primary object of the invention to provide an off-the-road tire having improved lateral stability of the vehicle on which it is employed, the ground contacting surface of the tread, which is provided by the radially outwardly facing surfaces 45 of each rib 44, is cylindrical, or at least substantially so. This is in contrast to the usual crown radius provided in tire treads, whereby the ground contacting surface is parti-spherical in shape. In other words, and as most clearly shown in FIGURE 5, all portions of the ground contacting surface 45 of each rib 44 are spaced at least substantially equidistantly from the rotational axis of the tire. While it is preferred that the surface 45 be parallel to the rotational axis of the tire, it has been found that this may result in a thickness of tread at the shoulder region which is sufficiently large that problems in curing result. Accordingly, it is within the scope of the present invention to construct the ground contacting surface 45 of each rib so that it slopes from the mid-circumferential line of the tire laterally of the tire and toward the rotational axis of the tire at an angle no greater than about 2½ degrees to the tire rotational axis. This very slight conical shape of the tread surface 45 on each side of the circumferential centerline has the advantage of facilitating removal of the tire from the mold after curing of the tire. Accordingly, it will be understood that where the tread is herein described as being cylindrical or the rib surface 45 is described as being parallel to the rotational axis of the tire, these or like phrases are intended to include the aforedescribed inclining of the surface 45 at an angle of no greater than about 2½ degrees to the tire rotational axis. In any event the outer surface 45 of each rib 44 at each side of the mid-circumferential centerline of the tire is a surface of revolution of a straight line about the tire rotational axis.

Each pair of next adjacent, oppositely facing groove sidewalls or traction rib flanks 50, like the similar sidewalls 30 of the grooves 16 of the tire of FIGURE 1, diverge outwardly from the bottom of each groove 16, making each groove wider at the tread surface than at the bottom of the groove. Further, and in accordance with another aspect of the invention, and in order to enhance the self-cleaning and lateral stability characteristics of the tread, the rib flanks 50 of each rib 44 converge from the mid-circumferential centerline of the tire and toward the tire sidewalls and shoulder regions.

The off-the-road tire according to the instant invention achieves markedly improved lateral stability provided by the lugs or the submerged ribs at the shoulder regions and by the wide flat cylindrical tread of the traction ribs which are supported, particularly at the shoulder region, by the lugs. Moreover, the lugs in the shoulder regions tend to resist side slip as does the divergence of the grooves.

It will thus be seen that objects of the invention set forth above and those made apparent from the preceding description have been atained. Inasmuch as changes may be made in the afore-described preferred embodiment and other embodiments of the invention could be made without departing from the scope thereof, it is intended that all matter contained in the foregoing description or shown in the accompanying drawing shall be interpreted as illustrative and not in a limiting sense.

While certain representative embodiments and details have been shown for the purpose of illustrating the invention, it will be aparent to those skilled in this art that various changes and modifications may be made therein without departing from the spirit or scope of the invention.

What is claimed is:

1. A pneumatic tire comprising a generally toroidal carcass, and under-tread portion disposed about and secured to the carcass, a tread portion disposed circumferentially about the under-tread portion and secured thereto, said under-tread portion increasing in thickness between the mid-circumferential plane of the tire and the sidewalls thereof, said tread portion being provided with a plurality of grooves extending generally laterally thereof and spaced apart circumferentially thereof to form intervening traction ribs, and a generally truncated triangular wedge integral with said tread and under-tread portion and extending upwardly from the bottom of each of said grooves in the shoulder region of the tire, each wedge being spaced substantially from said mid-circumferential plane and terminating at its outer end adjacent the laterally outer end of the respective groove.

2. A pneumatic tire comprising a generally toroidal carcass, a tread portion disposed circumferentially about and secured to the carcass, said tread portion having a plurality of grooves extending generally laterally thereof and spaced apart circumferentially thereof, said grooves defining intervening traction ribs, and a generally truncated triangular wedge integral with said tread portion extending upwardly from the bottom of each of said grooves in the shoulder region of the tire, each wedge being spaced substantially from the mid-circumferential plane of the tire and terminating at its outer end closely adjacent the outer end of the respective groove, each wedge having a height substantially less than the non-skid depth of the tread in the area of the wedge.

3. A pneumatic tire comprising a generally toroidal carcass, an under-tread portion, a tread portion disposed circumferentially about and secured to the carcass, said tread portion having a plurality of grooves extending generally laterally thereof and spaced apart circumferentially thereof, said grooves defining intervening traction ribs, and a generally truncated triangular wedge extending upwardly from the bottom of each of said grooves in each of the shoulder regions of the tire, each wedge being spaced substantially from the mid-circumferential plane of the tire and terminating at its outer end in inwardly spaced relation to the outer end of the respective groove, each wedge having an outer end surface facing generally in the direction of the rotational axis of the tire and extending at a large acute angle to said axis.

4. An off-the-road pneumatic tire comprising a generally toroidal carcass, an under-tread portion disposed about the carcass, a tread portion disposed circumferentially about the under-tread portion, said under-tread portion increasing in thickness between the mid-circumferential centerline of the tire and the sidewalls thereof, said tread portion being provided with a plurality of grooves extending generally laterally thereof and spaced apart circumferentially thereof to form intervening traction ribs, and a plurality of lugs integral with said tread and under tread portion and respectively disposed between the outer ends of each next adjacent pair of ribs, each lug having a first surface extending from the bottom of each respective groove from intermediate the centerline of the tread portion and an outer end of the groove and generally laterally outwardly of the tire in the general direction of the rotational axis of the tire, said first surface terminating in a second surface extending radially inwardly and laterally outwardly of the tire, said second surface terminating in a third surface extending generally toward said rotational axis.

5. A pneumatic tire comprising a generally toroidal carcass, a tread portion disposed circumferentially about the carcass and secured thereto, said tread portion being provided with a plurality of grooves extending generally laterally of the tread and spaced apart circumferentially thereof to form intervening traction ribs, and a wedge extending upwardly from the bottom of each of said grooves in the shoulder region of the tire, each wedge being spaced between the mid-circumferential plane of the tire and the outer end of the respective groove and including a first surface extending from the bottom of the respective groove generally laterally outwardly of the tire in the general direction of the rotational axis of the tire, said first surface terminating in a second surface extending radially inwardly and laterally outwardly of the tire at a large obtuse angle to said first surface, said second surface terminating in a third surface extending generally toward the axis of the rotation of the tire at a large acute angle thereto so as to face generally in the direction of said axis.

6. An off-the-road pneumatic tire comprising a generally toroidal carcass, an under-tread portion disposed circumferentially about and secured to the carcass, said under-tread portion increasing in thickness as it progresses laterally of the tire through the shoulder region of the tire, a tread portion disposed circumferentially about and secured to said under-tread portion and provided with a plurality of grooves extending laterally of the tread portion and spaced apart circumferentially thereof to define intervening traction ribs, a lug integral with said tread portion and extending upwardly from the bottom of each of said grooves in the shoulder region of the tire, said lug spanning the groove between the sidewalls of the next adjacent ribs and being spaced from the mid-circumferential plane of the tire and the outer end of the respective groove, each lug having a surface extending from the inner end of the lug at the bottom of said groove in a direction generally parallel to the axis of rotation of the tire and at a large obtuse angle to the next adjacent portion of the bottom of the groove to provide a relatively smooth continuation of said bottom of the groove, said lug extending upwardly from the bottom of said groove a distance substantially less than the non-skid depth of the tread in the region of the lug.

7. A pneumatic tire comprising a generally toroidal carcass, a tread portion disposed circumferentially about and secured to the carcass, said tread portion having a plurality of grooves extending generally laterally thereof and spaced apart circumferentially thereof to provide intervening traction ribs, and a generally truncated triangular wedge integral with said tread portion and extending upwardly from the bottom of the respective groove in the shoulder region of the tire a distance approximately equal to 40 to 45 percent of the non-skid depth of the tire in the region of the wedge, each wedge being spaced from the outer end of the respective groove and extending between the ribs on opposite sides of said next adjacent ribs.

8. A pneumatic tire comprising a generally toroidal carcass, an under-tread portion disposed about the carcass, a tread portion disposed circumferentially about the under-tread portion, said under-tread portion increasing in thickness between the circumferential centerline of the tire and the sidewalls thereof, said tread portion being provided with a plurality of grooves extending generally laterally of the tread and spaced apart circumferentially thereof to form intervening traction ribs, and a lug integral with said tread portion extending upwardly from the bottom of each of said grooves a distance equal to approximately 40 to 45 percent of the non-skid depth of the tire in the region of the lug, each lug extending between the next adjacent ribs on opposite sides of said lug, each lug having a first surface extending from the bottom of the respective groove from a point intermediate said centerline and end of the respective groove in a direction laterally outwardly of the tire and generally parallel to the rotational axis of the tire, said first surface terminating in a second surface extending at a large obtuse angle to said first surface and in a direction radially inwardly and laterally outwardly of the tire, said second surface terminating in a third surface extending generally toward the axis of rotation of the tire so as to face generally in the direction of said axis, said third surface terminating at the bottom of said groove at a point spaced substantially inwardly from the outer end of said groove.

9. An off-the-road pneumatic tire comprising a generally toroidal carcass, an under-tread portion disposed about the carcass, a tread portion disposed circumferentially about the under-tread portion, said under-tread portion increasing in thickness between the mid-circumferential centerline of the tire and the sidewalls thereof, said tread portion being provided with a plurality of grooves extending generally laterally thereof and spaced apart circumferentially thereof to form intervening traction ribs, and a plurality of lugs integral with said tread and under-tread portion and respectively disposed between the outer ends of each next adjacent pair of ribs, each lug having a first surface extending from the bottom of the respective groove from intermediate the centerline of the tread portion and an outer end of the groove and generally laterally outwardly of the tire, said first surface terminating in a second surface extending radially inwardly and laterally outwardly of the tire, said second surface terminating in a third surface extending generally toward said rotational axis, each of said ribs having a ground contacting outer surface at the periphery of the tire, each said ground contacting surface at each of the mid-circumferential centerline of the tread being a surface of revolution of a straight line about said rotational axis.

10. A pneumatic tire as described in claim 9 in which said straight line extends at an angle to from 0 degrees to no more than about 2½ degrees relative to said rotational axis.

11. A pneumatic tire as described in claim 9 in which each of said ribs has flanks which converge from adjacent the mid-circumferential centerline of the tire and toward the tire sidewalls.

12. A pneumatic tire as described in claim 11 in which each of said grooves is defined by oppositely facing flanks of a next adjacent pair of said ribs, said oppositely facing flanks of each said next adjacent pair of ribs diverging from the bottom of the respectively associated groove and outwardly of the tire.

13. An off-the-road pneumatic tire comprising a generally toroidal carcass, an under-tread portion disposed about the carcass, a tread portion disposed circumferentially about the under-tread portion, said tread portion being provided with a plurality of grooves extending generally laterally thereof and spaced apart circumferentially thereof to form intervening traction ribs, and a plurality of lugs integral with said tread and under-tread portion and respectively disposed between the outer ends of each next adjacent pair of ribs, each lug extending from one to the other of said next adjacent pair of ribs, each lug having an outer surface extending from intermediate the centerline of the tread portion and outer end of the respective groove and in a direction initially generally laterally and outwardly of the tire and then generally inwardly and laterally of the tire and lastly generally toward said rotational axis, each of said ribs having flanks which converge from adjacent the mid-circumferential centerline of the tire toward the tire sidewalls, each of said grooves each being defined by oppositely facing flanks of a next adjacent pair of said ribs, said oppositely facing flanks of each said next adjacent pair of ribs diverging from the bottom of the respectively associated groove and outwardly of the tire.

References Cited

UNITED STATES PATENTS

| 168,364 | 12/1952 | Martin | 152—209 X |
| 189,228 | 11/1960 | Rice | 152—209 X |
| 190,985 | 7/1961 | Blankenship | 152—209 X |
| 2,753,912 | 7/1956 | Mallow | 152—175 |
| 3,030,998 | 4/1962 | Jensen | 152—209 |

FOREIGN PATENTS

| 488,534 | 12/1952 | Canada. |
| 533,651 | 9/1931 | Germany. |
| 903,389 | 8/1962 | Great Britain. |
| 975,074 | 10/1950 | France. |

ARTHUR L. LA POINT, Primary Examiner